United States Patent [19]

Horikiri

[11] Patent Number: 5,163,035
[45] Date of Patent: Nov. 10, 1992

[54] CONSTANT LINEAR VELOCITY RECORDING SERVO CIRCUIT FOR WRITE-ONCE TYPE COMPACT DISK

[75] Inventor: Kenichi Horikiri, Kanagawa, Japan

[73] Assignee: Kabushiki Kaisha Kenwood, Tokyo, Japan

[21] Appl. No.: 514,037

[22] Filed: Apr. 26, 1990

[30] Foreign Application Priority Data

Apr. 28, 1989 [JP] Japan .................... 1-111851

[51] Int. Cl.⁵ .................. G11B 5/09; G11B 15/52; G11B 20/10; G11B 27/22
[52] U.S. Cl. .................... 369/47; 369/50; 369/32; 369/44.13
[58] Field of Search .............. 369/47, 48, 49, 50, 369/32, 43, 44.11, 44.13, 44.14, 44.27, 44.28, 44.29; 358/342; 360/73.01, 73.03, 73.09, 73.11, 73.12

[56] References Cited

U.S. PATENT DOCUMENTS

| | | | |
|---|---|---|---|
| 4,353,089 | 10/1982 | Winslow et al. | 369/48 |
| 4,603,412 | 7/1986 | Yamazaki | 369/43 |
| 4,646,280 | 2/1987 | Toyosawa | 369/50 |
| 4,675,855 | 6/1987 | Iso et al. | 369/43 |
| 4,855,978 | 8/1989 | Kanamaru | 369/43 |
| 5,023,856 | 6/1991 | Raaymakers et al. | 369/44.13 |

Primary Examiner—Tommy P. Chin
Assistant Examiner—Thai Tran
Attorney, Agent, or Firm—Sixbey, Friedman, Leedom & Ferguson

[57] ABSTRACT

A carrier frequency extracted as a tracking error signal from a disk with an optical pickup by a push-pull method is passed either through a high-pass filter having its cut-off frequency changing proportionally with the disk revolution number or corresponding to the carrier frequency at the disk ordinary revolution, or through a band-pass filter having its center frequency changing proportionally with the disk revolution number or corresponding to the carrier center frequency at the disk ordinary revolution. Therefore, the carrier frequency can be efficiently separated from the EFM signal during recording while allowing to use one beam in reading a tracking error signal and recording an EFM signal, and allowing a compatibility with presently used CD players. Further, the carrier frequency is used for the revolution control of a spindle motor during the revolution start and end, so that even while the tracking servo is not effected the revolution of the spindle motor can be controlled to enter into a fine control capture range.

5 Claims, 6 Drawing Sheets

CONSTANT LINEAR VELOCITY RECORDING SERVO CIRCUIT FOR WRITE-ONCE TYPE COMPACT DISK

BACKGROUND OF THE INVENTION

1. Field of the Invention

The present invention relates to a constant linear velocity (CLV) recording servo circuit for a write-once (WO) type compact disk (CD) which allows a simple structure of an optical pickup and a compatibility with presently used CD players.

2. Related Background Art

With a conventional recording CLV servo circuit as shown in FIG. 8, a revolution sync signal and absolute time code are extracted by reading pre-pits by means of a three-beam method which uses a control beam for tracking a pre-group and erase and write beams disposed at the right and left of the control beam.

Since the conventional method adopts the three-beam method, there is associated with the problems that the structure of an optical pickup is complicated and there is no compatibility with presently used CD players because of prepits.

SUMMARY OF THE INVENTION

The present invention has been made in consideration of the above problems. It is an object of the present invention to provide a CLV recording servo circuit for an optical disk wherein only one beam is used in reading a revolution sync signal and in recording an EFM (eight to fourteen modulation) signal with less leakage of the EFM signal during recording.

It is another object of the present invention to provide a CLV recording servo circuit for an optical disk compatible with presently used CD players.

According to an aspect of the present invention, there is provided a constant linear velocity recording servo circuit for a write-once type compact disk wherein:

a revolution sync signal for CLV servo control and an absolute time code are frequency-modulated;

a spiral guide groove is formed in a disk, the width in a radial direction of the guide groove changing with the waveform of a frequency-modulated carrier signal;

said carrier signal extracted as a tracking error signal from said disk with an optical pickup by means of a push-pull method is supplied to a phase locked loop circuit either via a high-pass filter having a cut-off frequency changing proportionally with a disk revolution number or via a band-pass filter having a center frequency changing proportionally with the disk revolution number;

said revolution sync signal frequency-demodulated by said phase locked loop circuit is frequency-multiplied to obtain a fine control signal;

the tuning frequency of said phase locked loop circuit is frequency-divided to obtain a coarse control signal;

a reference frequency is compared with said coarse control signal or said fine control signal by a phase frequency comparator;

the revolution of a spindle motor is controlled in accordance with an output of said phase frequency comparator so as to make said coarse control signal or said fine control signal coincident with said reference frequency; and an input to said phase frequency comparator is changed from said coarse control signal to said fine control signal, and said carrier signal passing through said high-pass filter is changed to pass through said band-pass filter, respectively when a lock detection signal is generated from said phase frequency comparator while said coarse control signal is being compared with said reference frequency.

According to another aspect of the present invention, there is provided a constant linear velocity recording servo circuit for a write-once type compact disk wherein:

a revolution sync signal for CLV servo control and an absolute time code are frequency-modulated;

a spiral guide groove is formed in a disk, the width in a radial direction of the guide groove changing with the waveform of a frequency-modulated carrier signal;

said carrier signal extracted as a tracking error signal from said disk with an optical pickup by means of a push-pull method is supplied to a phase locked loop circuit either via a high-pass filter having a cut-off frequency corresponding to a carrier signal frequency at an ordinary disk revolution or via a band-pass filter having a center frequency same as the carrier signal central frequency at the ordinary disk revolution;

said revolution sync signal frequency-demodulated by said phase locked loop circuit is frequency-multiplied to obtain a fine control signal;

the tuning frequency of said phase locked loop circuit is frequency-divided to obtain a coarse control signal;

a reference frequency is compared with said coarse control signal or said fine control signal by a phase frequency comparator;

the revolution of a spindle motor is controlled in accordance with an output of said phase frequency comparator so as to make said coarse control signal or said fine control signal coincident with said reference frequency; and an input to said phase frequency comparator is changed from said coarse control signal to said fine control signal, and said carrier signal passing through said high-pass filter is changed to pass through said band-pass filter, respectively when a lock detection signal is generated from said phase frequency comparator while said coarse control signal is being compared with said reference frequency.

A carrier frequency extracted as a tracking error signal from a disk with an optical pickup by means of a push-pull method is passed either through a high-pass filter having its cut-off frequency changing proportionally with the disk revolution number or corresponding to the carrier frequency at the disk ordinary revolution, or through a band-pass filter having its center frequency changing proportionally with the disk revolution number or corresponding to the carrier center frequency at the disk ordinary revolution. Therefore, the carrier frequency can be efficiently separated from the EFM signal during recording while allowing to use one beam in reading a tracking error signal and recording an EFM signal, and allowing a compatibility with presently used CD players.

Further, the carrier frequency is used for the revolution control of a spindle motor during the revolution start and end, so that even while the tracking servo is not effected the revolution of the spindle motor can be controlled to enter into a fine control capture range.

DETAILED DESCRIPTION OF THE PREFERRED EMBODIMENTS

Figure 1:
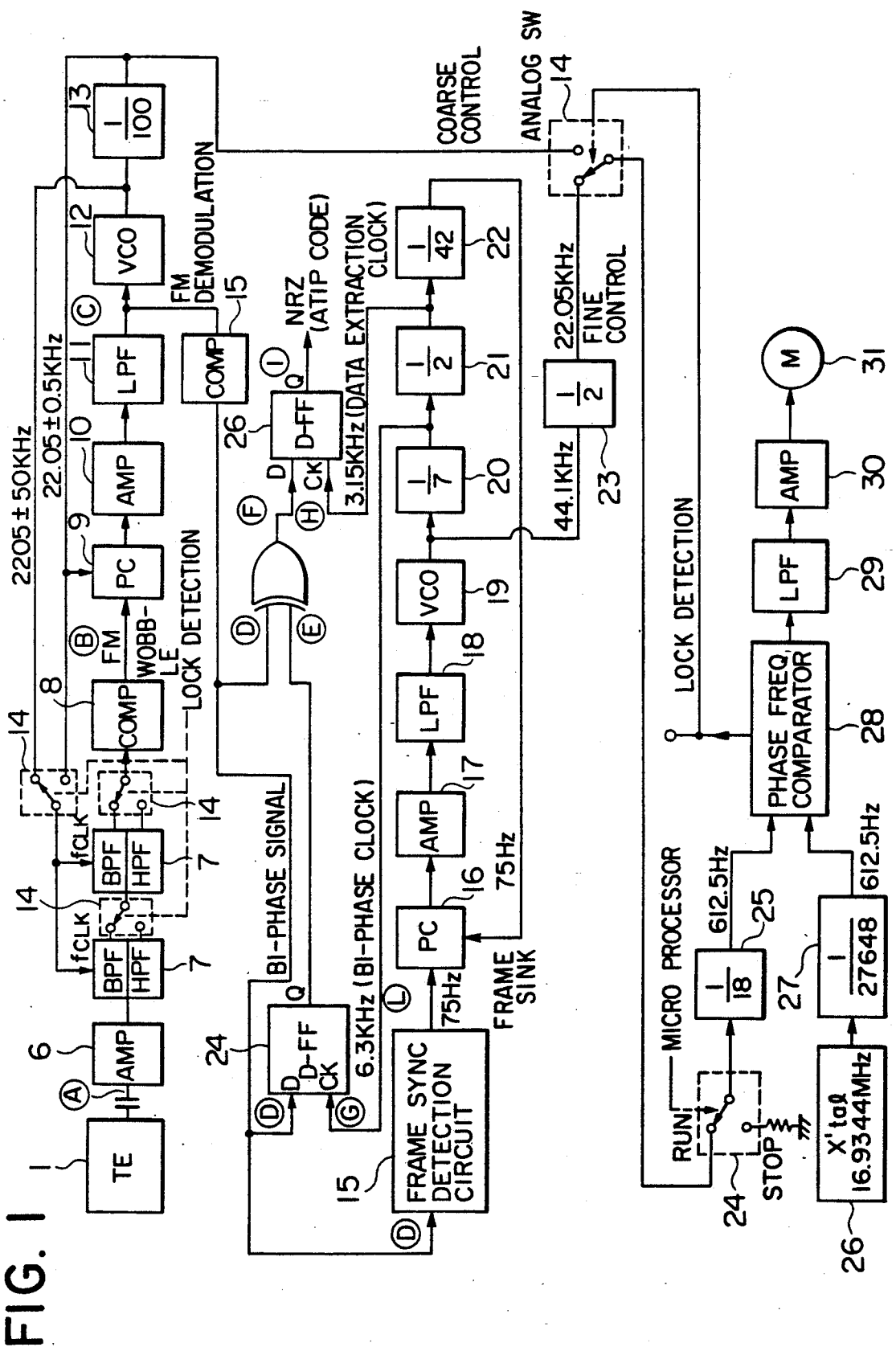
FIG. 1 is a block diagram showing an embodiment of the CLV recording servo circuit for a write-once type compact disk according to the present invention.

Preferred embodiments of this invention will be described with reference to the accompanying drawings. FIG. 1 is a block diagram showing a constant linear velocity (CLV) servo circuit according to the embodiment of this invention.

Referring to FIG. 1 a tracking error detection circuit 1 detects a tracking error of a laser spot applied to a guide groove of a rotating disk.

Figure 2:
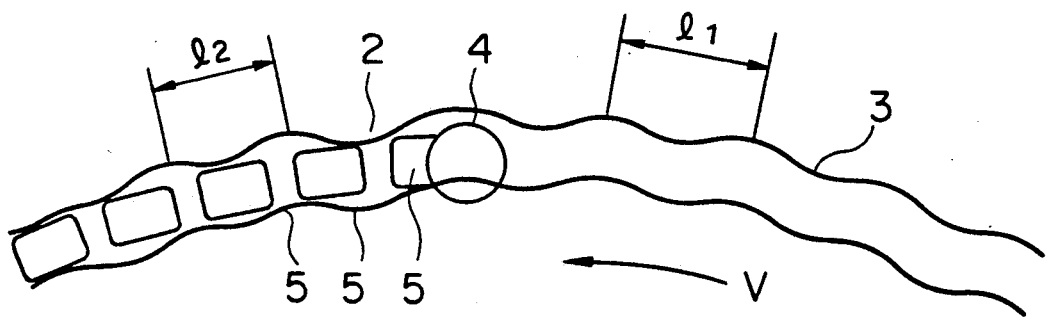
FIG. 2 shows the guide groove of a disk used in the embodiment.

As shown in FIG. 2, a guide groove 3 is formed in a disk 2. The width of the guide groove changes in the disk radial direction. By using a push-pull method, a tracking error signal of a laser spot 4 applied to the guide groove 3 is obtained as a difference between two outputs from the innermost and outermost sections of a four-section detector of an optical pickup.

Carrier frequencies are obtained by dividing a disk linear velocity V by wavelengths such as 11, 12 indicated in FIG. 2 along the guide groove. Carrier frequencies are frequency-modulated (FM) by a revolution synchronization or sync signal and absolute time code.

A reflected laser spot light is used for servo tracking. If a high intensity laser spot from a laser diode is used, data modulated as an EFM (eight to fourteen modulation) signal can be written in the guide groove as pits 5, 5, ...

The carrier signal is called a wobble signal because of the shape of the guide groove. This wobble signal with the d.c. component removed by a capacitor is amplified by an amplifier 6.

In this embodiment, the center frequency of the wobble signal is set at 22.05 kHz.

Figure 3:
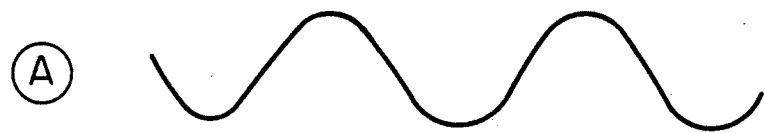
FIG. 3 shows waveforms of a wobble signal in the embodiment circuit.
Figure 3:
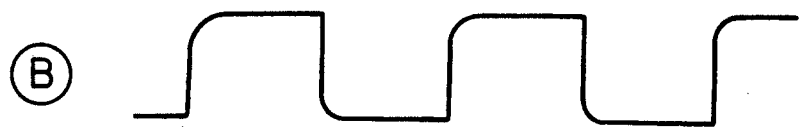

The wobble signal then passes through cascade-connected filters 7, 7 and are subjected to waveform shaping at a comparator 8. The waveforms after and before the waveform shaping respectively at circuit portions indicated at (A) and (B) are shown in FIG. 3.

The filter 7 is of a type called switched capacitor filter. Each filter 7 has a high-pass filter and a band-pass filter fabricated in a single chip. The ratio of the cut-off frequency of the high-pass filter to a clock frequency and the ratio of the center frequency of the band-pass filter to the clock frequency are arranged to be determined by the values of external resistors (in this embodiment the ratio is set to 1/100).

In this embodiment, two filters of a second order inversion mode are cascade-connected, so that the overall filter characteristic shows a fourth order non-inversion mode.

The wobble signal selectively passes either through the high-pass filters or through band-pass filters when analog switches 14, 14 are activated by a lock detection signal to be described later.

A clock signal for use with the filters is also changed when another analog switch 14 is activated by the lock detection signal.

The wobble signal subjected to waveform shaping at the comparator 8 is then inputted to a phase comparator 9. The phase comparator 9 generates a voltage corresponding to a phase difference between two signals inputted thereto. The generated voltage is then amplified by an amplifier 10, passed through a low-pass filter 11, and inputted to a voltage controlled oscillator 12.

An output from the voltage-controlled oscillator 12 which changes its oscillation frequency with an input control voltage, is frequency-divided at 1/100 by a frequency divider 13 and fed back to the phase comparator 9.

A closed loop called a phase locked loop (PLL) is formed by the phase comparator 9, amplifier 10, low-pass filter 11, voltage controlled oscillator 12 and frequency divider 13. The phase and frequency of an output from the frequency divider 13 are thus made equal to those of the wobble signal, the output from the frequency divider 13 being used as a coarse control signal. The signal at an input of the voltage controlled oscillator 12 is an FM demodulated wobble signal.

Figure 4:
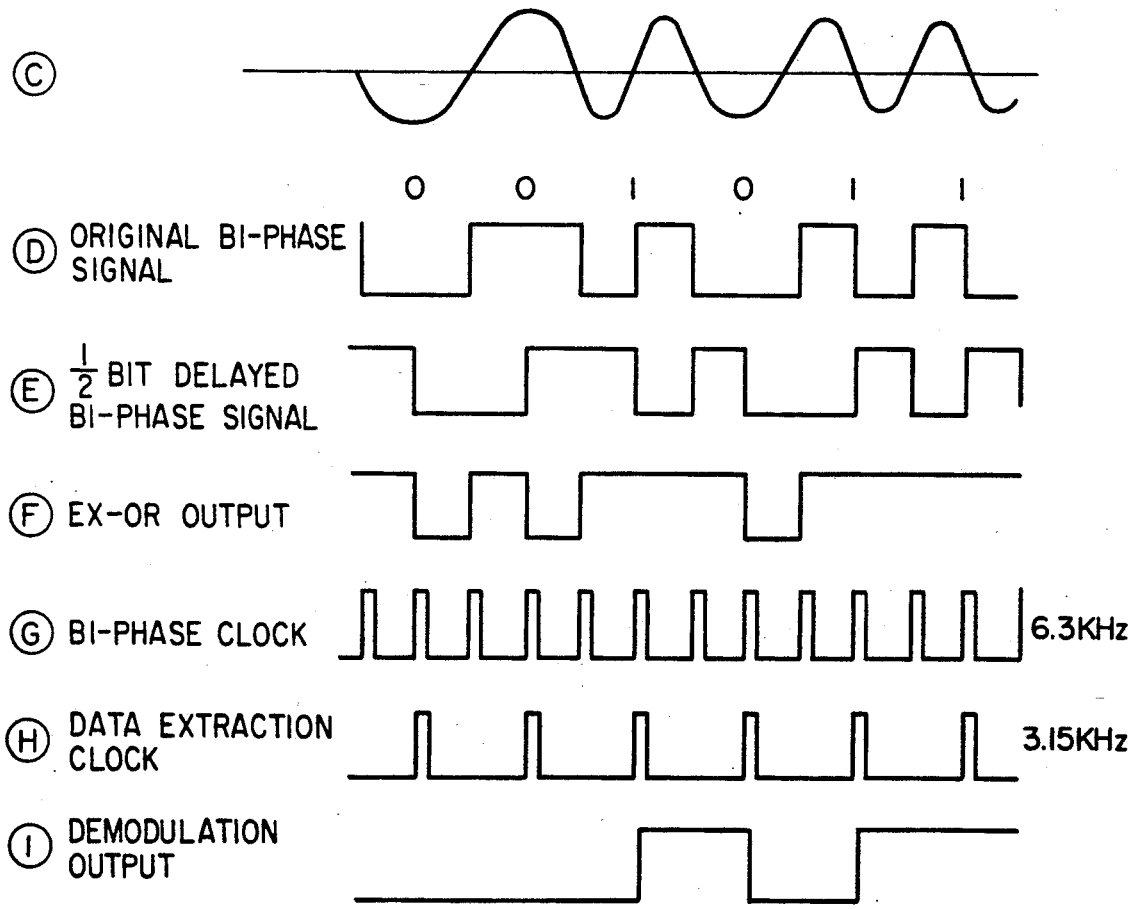
FIG. 4 shows waveforms at circuit portions of the bi-phase demodulation circuit of this embodiment.

The waveform of the FM demodulated wobble signal at a circuit portion (C) is shown in FIG. 4. This signal is subjected to waveform shaping at a comparator 15 to obtain an original bi-phase signal at a circuit portion (D).

The bi-phase signal is a signal which is obtained by modulating an NRZ signal or absolute time code (ATIP code) by two signals having periods T and 2T respectively (T=1.6.3 kHz=159 microseconds), and it has at each frame a frame sync signal including signals having a 3T period.

A revolution sync signal or frame sync signal of 75 HZ can be extracted from the original bi-phase signal by a frame sync detection circuit 15.

Figure 5:
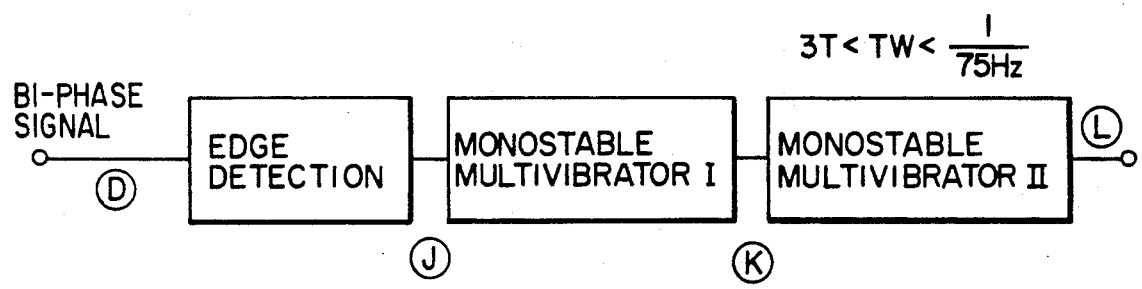
FIG. 5 shows a block diagram of the frame sync detection circuit and waveforms at circuit portions of the circuit.
Figure 5:
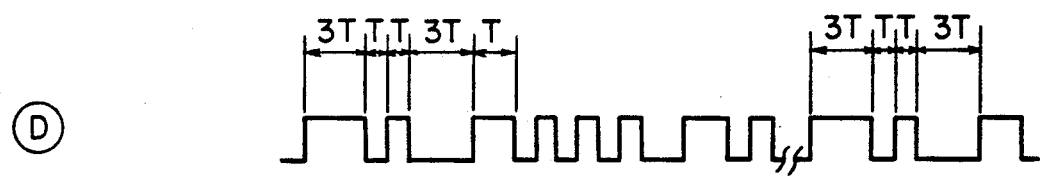
Figure 5:
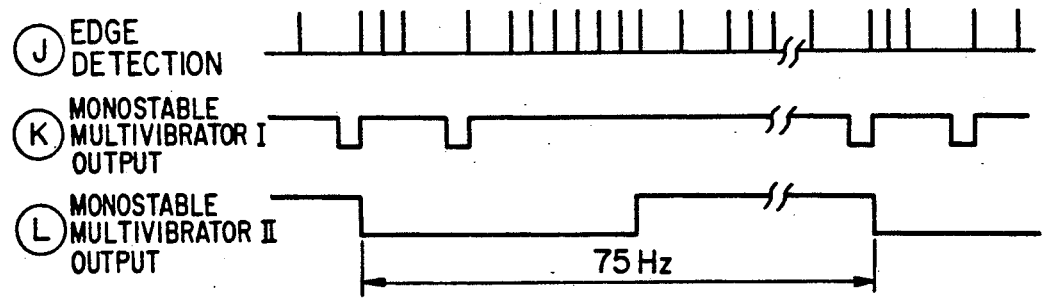

The frame detection circuit 15 is constructed of an edge detection circuit and two cascaded monostable multivibrators as shown in FIG. 5.

The bi-phase signal has at least one level transition per one bit period. Also during the frame sync period during which the bi-phase rule is not adapted, there is one level transition during one bit period.

The edge detection circuit for detecting a level transition time is an Exclusive OR circuit for obtaining an Exclusive OR between its input signal and a signal slightly delayed from the input signal.

An edge detection signal is arranged to trigger the monostable multivibrator I which is set to output a 2.5 T signal, so that the retriggerable monostable multivibrator I outputs a 2.5 T signal for the 3T signal only and outputs no signal for other signals having a shorter period. The 2.5 T output signal is arranged to trigger the next retriggerable monostable multivibrator II which is set to output a signal longer than 3T and shorter than 75 Hz, so that a frame sync signal of 75 Hz can be detected without being influenced by a pulse signal at the trailing edge of the 2.5 T signal from the monostable multivibrator I.

The waveforms at circuit portions (D), (J), (K) and (L) of the frame sync detection circuit are shown in FIG. 5.

The frame sync signal of 75 Hz thus obtained is inputted to a phase comparator 16.

The phase comparator 16 generates a voltage corresponding to a phase difference between its two input signals. The generated voltage is amplified by an amplifier 17 and inputted via a low-pass filter 18 to a voltage controlled oscillator 19.

The voltage controlled oscillator 15 changes its oscillation frequency with a supplied control voltage. An output from the voltage controlled oscillator 15 is frequency divided by 1/7, ½ and 1/42 respectively at frequency dividers 20, 21 and 22. The output from the frequency divider 22 is fed back to the phase comparator 16.

A closed loop called a PLL (phase locked loop) is formed by the comparator 16, amplifier 17, low-pass filter 18, voltage controlled oscillator 19, and frequency dividers 20, 21 and 22. The phase and frequency of an output from the frequency divider 22 are coincident with those of the frame sync signal. An output of the voltage controlled oscillator 19 has a constant frequency of 44.1 kHz which is a multiplication of the frame sync signal frequency 75 Hz by $7 \times 2 \times 42$. This frequency 44.1 kHz is frequency divided by ½ at a frequency divider 23 to obtain a fine control signal of 22.05 kHz.

The original bi-phase signal is demodulated by a bi-phase demodulation circuit into an NRZ signal to thus obtain an absolute time code ATIP. The bi-phase demodulation circuit is constructed of a D-type flip-flop 24, Exclusive OR circuit 25 and D-type flip-flop 26.

More specifically, the original bi-phase signal is delayed by ½ bit at the D-type flip-flop 24 to which supplied as its clocks are bi-phase clocks of 6.3 kHz outputted from the frequency divider 20. The ½ bit delayed bi-phase signal and the original bi-phase signal are subjected to an Exclusive OR operation at the Exclusive OR circuit 25. The output from the Exclusive OR circuit 25 is supplied to the D type flip-flip 26 to which supplied as its clocks are data extraction clocks (3.15 kHz) obtained through division of the bi-phase clock by ½ at the frequency divider 21, to accordingly obtain an absolute time code ATIP.

The waveforms at circuit portions (C), (D), (E), (F), (G) and (H) of the bi-phase demodulation circuit are shown in FIG. 4.

The absolute time code ATIP thus obtained is identical to the Q bit of the CD sub-code so that this ATIP code can be used in moving the optical pickup at the start and end of recording, and in adding a sub-code to the EFM signal.

The coarse and fine control signals are selected by the analog switches 14 and 24, and frequency divided by 1/18 at a frequency divider 25 to thereby obtain a revolution number feedback signal of the spindle motor proportional to the disc revolution number.

The revolution number feedback signal takes a frequency of 612.5 Hz when the revolution of the spindle motor is held in a controlled state. The feedback signal is inputted to one input terminal of a phase frequency comparator 28.

To the other input terminal of the phase frequency comparator 28, there is applied an output of a crystal oscillator 26 with an oscillation frequency 16.9344 MHz after frequency divided by 1/27648 at a frequency divider 27.

The phase and frequency comparator 28 generates an output voltage corresponding to the differences between input signal frequencies and phases. The output voltage is supplied via a low-pass filter 29 and amplifier 30 to the spindle motor 31 to control it so as to make equal the input signal frequencies and phases.

The phase frequency comparator 28 outputs a lock detection signal when the frequencies of the two input signals become substantially equal, the lock detection signal changing the contact state of analog switches 14. The contact state of the analog switches shown in FIG. 1 is for the case the lock detection signal is outputted.

If the spindle motor 31 is to be stopped, the micro processor causes the analog switch 24 to supply a zero input to the phase frequency comparator 28 so that the output of the amplifier 30 becomes zero to prevent the spindle motor from running away.

In operation of the CLV servo circuit constructed as above, the revolution of the spindle motor is controlled by the coarse control signal during the revolution start and end periods. In this case, since the coarse control signal is obtained through frequency division of the wobble signal which is generated even while the tracking servo is not effected, the revolution control for the spindle motor becomes possible.

Also in this case, the filters 7 act as high-pass filters having a cut-off frequency one/hundredth of the normal revolution number, thereby allowing the wobble signal to pass through the filters 7 even under low revolution operation.

When a lock detection signal is outputted, the revolution of the spindle motor is controlled by the fine control signal. In this case, the filters 7 act as fourth order band-pass filters whose center frequency is the wobble signal frequency. Accordingly, the frequency separation ability is high, and in addition the EFM signal during recording is less leaked out because the bi-phase signal is extracted at the PLL, so that a fairly stable revolution sync signal can be obtained. Further, since the reference oscillation frequency is set at 16.934 MHz, this frequency can be used in common as the master clocks of presently used CD players, thereby providing economical advantages.

Figure 6:
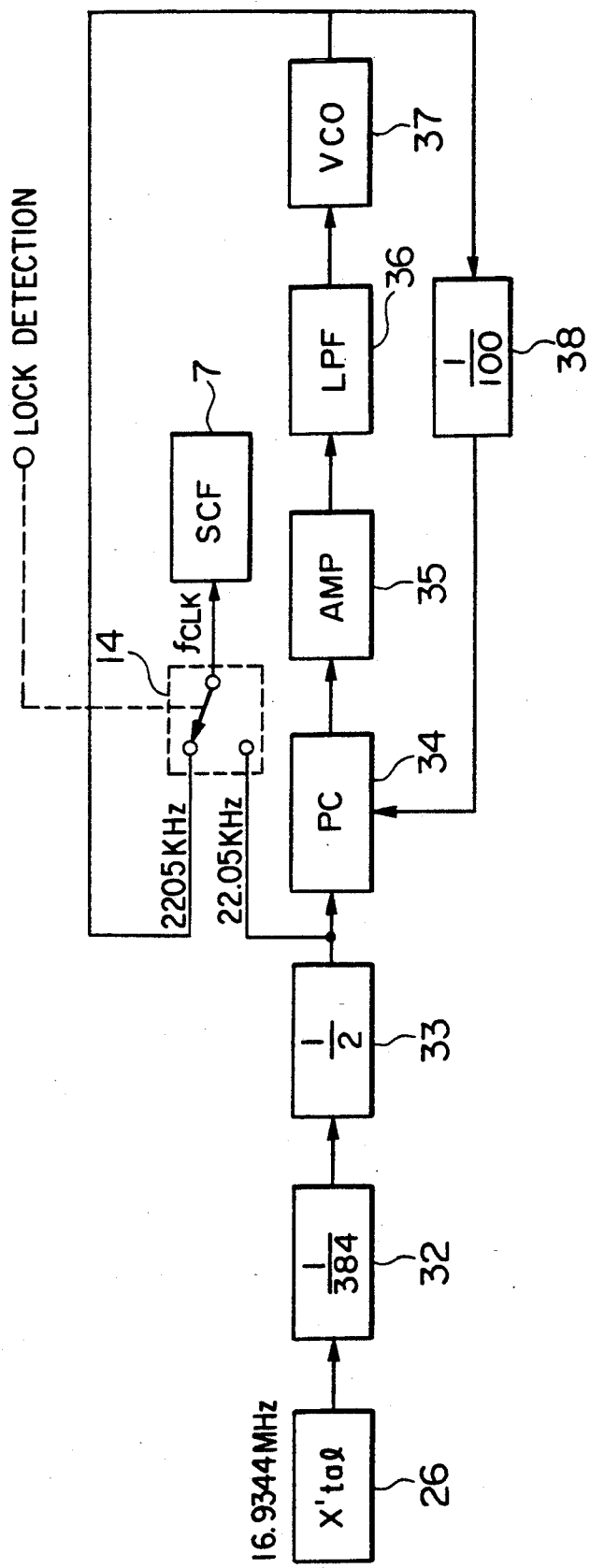
FIG. 6 is a block diagram showing a modification in part of the circuit shown in FIG. 1.

FIG. 6 is a block diagram of the circuit which generates clocks for the filters 7 (switched capacitor filters) by using a reference oscillator 26.

As the clocks for the switched capacitor filters, there are used a 22.05 KHz and a signal obtained multiplying the 22.05 KHz signal by 100, which are switched by the lock detection signal. The 22.05 KHz signal is obtained by frequency dividing the oscillation output of the reference oscillator 26 by frequency dividers 32 and 33. The 22.05 KHz signal is multiplied by 100 by a PLL circuit constructed of a phase comparator 34, amplifier 35, low-pass filter 36, voltage controlled oscillator 37 and frequency divider 38.

With the above arrangement, the cut-off and center frequencies of the switched capacitor filters can be controlled so as to match the revolution number of the spindle motor.

Figure 7:
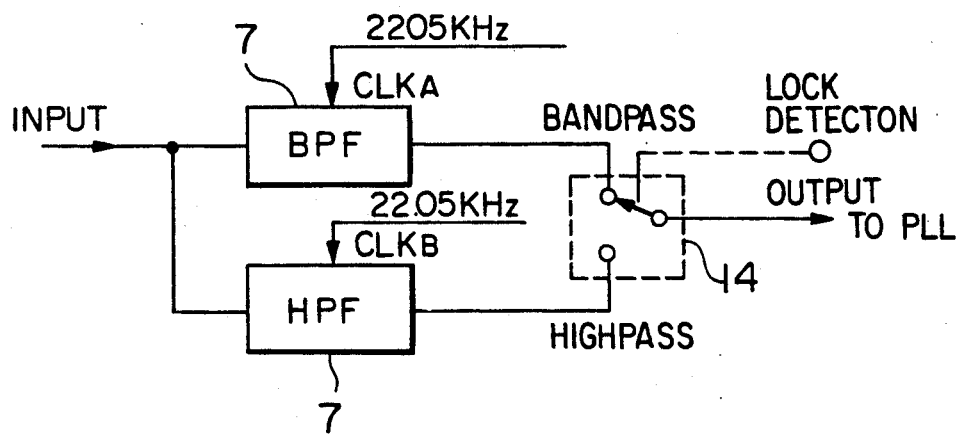
FIG. 7 is a block diagram showing a modification in part of the circuit shown in FIG. 1.
Figure 8:
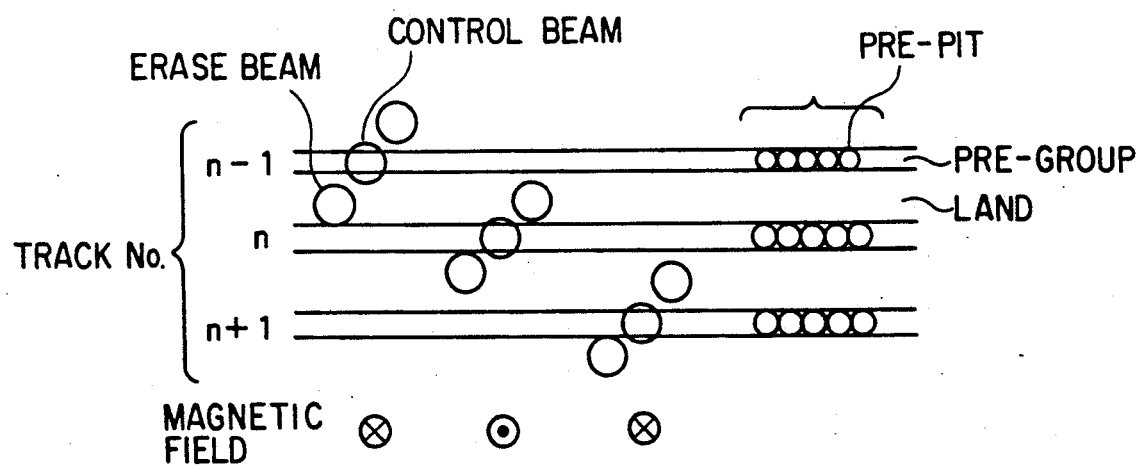
FIG. 8 is a schematic diagram of a disk illustrating a three-beam method.

FIG. 7 is a block diagram showing a circuit wherein different clock frequencies are continuously supplied to the filters 7 (switched capacitor filters) and the outputs from the high-pass filters and band-pass filters are switched by the analog switch to supply the selected output to the PLL circuit. With such an arrangement, only one analog switch is required to selectively use the high-pass filters and band-pass filters.

As seen from the foregoing description of this invention, only one beam is used in reading the revolution sync signal and recording the EMF signal, thereby allowing a simple structure of an optical pickup and a compatibility with presently used CD players.

Further, the coarse control signal obtained through frequency division of the wobble signal is used for the revolution control of the spindle motor during the revolution start and end. Since the wobble signal is generated even while the tracking servo is not effected, the stable start and end revolution operation of the spindle motor becomes possible.

Furthermore, when a lock detection signal is detected, the fine control signal is used for the revolution control of the spindle motor. In this case, the band-pass filters have the center frequency same as the wobble signal frequency. Accordingly, the frequency separation ability is high, and in addition the EFM signal during recording is less leaked out so that a fairly stable revolution sync signal can be obtained. Further, if the reference oscillation frequency is set at 16.934 MHz, this frequency can be used in common as the master clocks of presently used CD players, thereby providing economical advantages.

While the presently preferred embodiments of the present invention have been shown and described, it is to be understood that this disclosure is for the purpose of illustration and that various changes and modifications may be made without departing from the scope of the invention as set forth in the appended claims.

What is claimed is:

1. A servo circuit for controlling a compact disk in a constant linear velocity, the compact disk having a spiral guide groove wobbled according to a wobbling signal of a predetermined carrier frequency which is frequency-modulated with a revolution synchronization signal, comprising:

pick-up means for optically picking up the wobbling signal as a tracking error from the spiral guide groove on the disk;
   filter means for frequency-filtering the wobbling signal picked-up by said pick-up means;
   means for extracting the carrier frequency signal from the filtered wobbling signal in the form of an extracted carrier signal;
   means for demodulating the filtered wobbling signal to regenerate the revolution synchronization signal;
   control means for comparing the frequency of a control signal with a reference signal and controlling a spindle motor with the comparison results so that the control signal coincides with the reference signal in frequency, the spindle motor revolving the compact disk, and a lock signal being generated upon the coincidence in said comparison; and
   switch means for selectively applying one of the extracted carrier signal and the regenerated revolution synchronization signal as the control signal to said control means,
   wherein upon starting the spindle motor, said switch means applies the extracted carrier signal to said control signal and in response to the lock signal applies the revolution synchronization signal to said control signal in place of the extracted carrier signal.

2. The servo circuit according to claim 1, wherein said filter means operates as a high-pass filter upon starting the spindle motor and in response to the lock signal operates as a band-pass filter.

3. The servo circuit according to claim 2, wherein said filter means is a switched capacitor filter.

4. A servo circuit for controlling a compact disk in a constant linear velocity, the compact disk having a spiral guide groove wobbled according to a wobbling signal of a predetermined carrier frequency comprising:

pick-up means for optically picking up the wobbling signal as a tracking error signal from the spiral guide groove on the disk;
   filter means for frequency-filtering the wobbling signal picked-up by said pick-up means;
   means for extracting the carrier frequency signal from the filtered wobbling signal in the form of an extracted signal; and
   control means for comparing a frequency of the carrier signal with a reference signal and controlling a spindle motor with the comparison results so that the carrier signal coincides with the reference signal in frequency, the spindle motor revolving the compact disk, and a lock signal being generated upon the coincidence in said comparison;
   wherein upon starting the spindle motor, said filter means operates as a high-pass filter the cut-off frequency of which is set at a frequency lower than a normal operating frequency, and in response to the lock signal said filter means operates as one of high-pass filter and a bandpass filter, the cut-off frequency or the center frequency of which is the normal operating frequency.

5. The servo circuit according to claim 4, wherein said filter means is a switched capacitor filter.

* * * * *